March 21, 1939.  H. F. EKEN  2,151,466

VALVE

Filed Aug. 1, 1938

INVENTOR
*Harry F. Eken*
BY *Frank Zugelter*
ATTORNEY

Patented Mar. 21, 1939

2,151,466

UNITED STATES PATENT OFFICE 2,151,466

VALVE

Harry F. Eken, Cincinnati, Ohio

Application August 1, 1938, Serial No. 222,313

8 Claims. (Cl. 273—65)

This invention relates to valves and more particularly to valves such as are used in various sporting goods, for example footballs, basket balls, volley balls, punching bags, beach balls and the like.

An object of the invention is to provide a valve which is simple in structure and inexpensive to manufacture and assemble.

A further object of the invention is to provide a valve so constructed as to permit easy insertion and withdrawal of an inflating tool.

Still a further object of the invention is to provide a valve so constructed as to eliminate the necessity of lubricants, such as glycerine, upon the exterior of an inflating tool in order to expedite the insertion and withdrawal of such a tool into and out of said valve.

These and other objects are attained by the means described herein, and disclosed in the accompanying drawing, in which.

Figure 1:
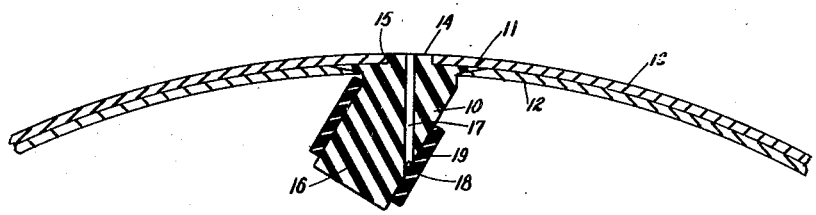
Fig. 1 is a vertical sectional view of the valve comprising the invention attached to an inflatable article.

As clearly shown in Fig. 1, the valve assembly 10 comprises an annular flange 11 adapted to be secured to bladder 12 of the article to be inflated by any suitable means such as adhesives, cement or by means of vulcanization. A cover member 13 of leather or other suitable material is disposed outwardly of bladder 12 as is the usual practice in inflatable sporting goods. An annular disklike locating member 14 may be provided as an integral part of flange 11. Locating member 14 is adapted to extend outwardly of cover 13 through a suitable aperture 15 provided through said cover for that purpose.

A stem 16 is provided at an oblique angle with the plane of flange 11. Said stem may be formed integral with flange 11 and locating member 14, in which case they may be molded or otherwise formed as a unit hereinafter called the stem assembly.

A passageway or duct 17 is provided through the stem assembly as shown, being aligned at substantially right angles with the plane of the flange 11. One end of passageway or duct 17 is disposed centrally of locating member 14, and the other end thereof terminates as an aperture or inner terminus 18 in the side of stem 16. It should be noted that passageway 17 is of uniform bore with the result that it may be formed in the stem assembly when said stem is molded.

An annular endless band of suitable elastic 19 such as vulcanized rubber or the like is fitted over stem 16 in such a manner as to tightly hug the entire circumference of said stem whereby a lower edge of said elastic band forms a resilient flap which effectively seals aperture 18 due to the inherent yielding characteristics of band 19.

A suitable inflating gas or liquid may be introduced into the article to be inflated by means of a suitable inflating tool 20 which comprises a hollow needle like tube 120 having a blunt rounded end or tip 21. A suitable inflating medium is introduced through tool 20 being discharged from the end thereof through a suitable opening as 22.

An inflating tool as described may be easily introduced into passageway 17 of the valve assembly whereby tip 21 emerges from aperture 18 which is disposed over said aperture. Tip 21 lifts elastic band 19 back away from aperture 18 as clearly shown in Fig. 2 whereby tool 20 may be inserted into the interior of the article to be inflated any desired distance for the actual process of inflation.

Inflating tool 20 may be withdrawn from the valve assembly by simply pulling the same outward whereby elastic band 19 will reseat over aperture 18 as said tool is withdrawn.

Figure 4:
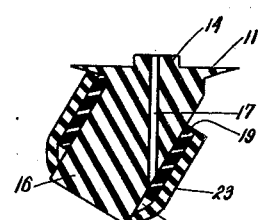
Fig. 4 is a vertical cross sectional view of the valve of Fig. 1 but having a second elastic band disposed thereon.

If desired, a second elastic band 23 (Fig. 4) may be disposed around elastic band 19 for the purpose of preventing undue oxidation of the inner band 19. The outer elastic band 23 also augments the closing or sealing effect of the inner band 19. As shown in Fig. 4, the preferred form of the outer band 23 extends beyond the end of the inner band as at 24, terminating in annular contact with stem 16. In operation, the valve shown in Fig. 4 is identical with that of the valve shown in Figs. 1 and 2.

Figure 5:
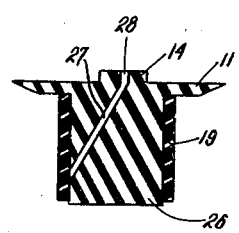

If desired, the stem portion 26 of the valve assembly may be disposed at right angles to flange 11 as shown in Fig. 5, in which event the passageway 27 is provided at an oblique angle with the flange as shown. The upper portion of said passageway disposed in locating member 14 may be aligned with said locating member as shown.

As before, an elastic band 19 is provided around stem 26 as shown.

Figure 6:
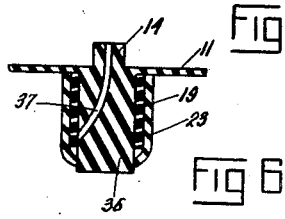

A modified form of the stem assembly is shown in Fig. 6 in which stem 36 has a passageway 37 which is arcuate in form. When an inflating tool as 20 is inserted into this valve, the outer portion of stem 36 will be moved to the right as the inflating tool is inserted through passageway 37. The action of elastic bands 19 and 23 is the same as hereinabove described.

Figure 7:
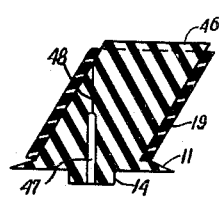
Figs. 5, 6 and 7 are vertical sectional views of modified forms of the invention.
Figure 2:
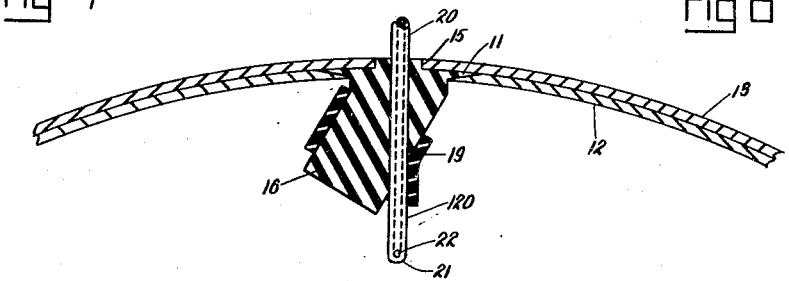
Fig. 2 is a view similar to Fig. 1 with an inflating tool in inflating or deflating position.
Figure 3:
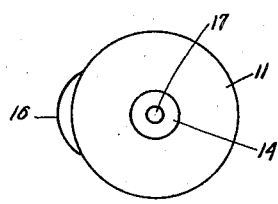
Fig. 3 is a top plan view of the valve stem comprising the invention.

A modified form of stem assembly shown in Fig. 7 comprises an upstanding stem 46 having a duct or passageway 47 provided partially through said stem. A cut or slit 48 is provided through that portion of stem 46 which is above and in vertical alignment with passageway 47, thereby to form a feather-edged flap, as shown. As before, a suitable elastic band or sealing member 19 is provided externally of stem 46 for yieldingly closing passageway 47 by maintaining the opposed walls of slit 48 in contact with each other. Sealing member 19 also prevents the escape of air from a bladder or other inflated article by physically sealing the perimeter of cut 48 where it intersects the side wall of stem 46. Such sealing member, of course, may be omitted in this case, as the cut is self-closing under pressure like any other one-way check valve of a flexible nature. When an inflating tool is introduced upwardly through passageway 47, the blunt rounded tip 21 separates the opposed edges of cut 48 thereby permitting said tool to be introduced therebetween. Further insertion of said tool causes the tip 21 to emerge from said slit and flex the closure member 19 away from stem 46 substantially as shown in Fig. 2 whereby said tool is free to enter the interior of the article to be inflated.

It should be understood that in the type valve herein disclosed, the need for lubricating the inflating tool with a heavy lubricant such as glycerine, is eliminated, since the passageway in each instance is of uniform cross-section throughout its length. However, in some instances, it may be advantageous to moisten said inflating tool with water to expedite the initial insertion of said tool.

Due to the inherent characteristics of the elastic bands 19 and 23, the aperture 18 is sealed as soon as the inflating tool is withdrawn, said sealing action being dependable and positive in action.

An inflated article may be deflated by inserting an inflating tool and permitting the pressure within the inflated article to be reduced, as desired.

It should be understood that the stem may be made of any suitable material other than para.

The valve assembly herein disclosed is adapted to be vulcanized into the article to be inflated, since there are no parts of the valve assembly which would be adversely affected by the heat of vulcanization.

In order to prevent the accidental deflation of the bladder while an inflating tool is inserted through such a valve, it is desirable to have the diameter of the passageway 17 somewhat smaller than the outside diameter of the inflating tool, to insure a pressure tight fit.

Figure 8:
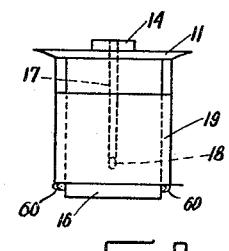
Fig. 8 is a front elevation of the valve shown in Fig. 1.

If desired, a pair of retaining members 60 may be provided on stem 16 as a safety measure to prevent the closure member 19 from slipping off of the end of stem 16. Such a retaining member may be in the form of a small bump molded as an integral part of said stem as shown in Fig. 8.

It should be noted that in each instance the elastic band or sealing means is moved from its normal position, viz: that of sealing the end of passageway 17, by reason of the obliquity of the angle with which the tip of inflating tool 20 contacts said sealing means. By reason of the oblique angle of contact between the tip of the inflating tool, the sealing means is shoved or flexed sidewise away from the end of aperture 18 whereby the inflating tool is free to extend between the outer side of that portion of stem 16 below aperture 18 and the inner side of said sealing means 19 as clearly shown in Fig. 2.

It is to be understood that various modifications and changes in the structural details of the device may be made, within the scope of the appended claims, without departing from the spirit of the invention.

What is claimed is:

1. As a new article of manufacture a valve comprising a stem having an inner end and an outer end, and means for attachment of the stem to an article to be inflated, said stem including a passageway extending through said stem, said passageway being sufficiently straight to permit complete unobstructed through-penetration by a rigid inflating tool, one end of said passageway terminating at the outer end of said stem, the other end of said passageway terminating in the side wall of said stem, and means in the form of a resilient flap carried by said stem for closing said other end of the passageway, said flap meeting the passageway at an acute sharp angle and extending in substantially the same direction as the passageway, to establish a substantially aligned ready exit for an inflating tool moved through the passageway past said flap.

2. As a new article of manufacture, a valve for inflatable articles which comprises a stem having a duct formed therein, said stem including an outer end and an inner end, said duct extending from said outer end inwardly with its axis divergent from the axis of the valve stem to such an extent as to cause the inner terminus of the duct to emerge from the valve stem at a location intermediate the inner and outer ends of the stem, and yieldable closure means disposed at an acute sharp angle to the duct at the inner terminus thereof, and extending in substantially a common direction with the duct, to provide a closable exit substantially aligned with the duct to afford complete penetration of the valve by the head of an inflating tool adapted to enter fully into the inflatable article for the purpose of deflation thereof.

3. As a new article of manufacture, a valve for inflatable articles, which comprises a rubber-like stem having a duct formed therein, said duct having an inner closable end and said stem including an outer end and an inner end, the duct being substantially straight so as to offer but slight resistance to complete penetration of the valve by a rigid inflating tool, said duct extending from the outer end of the stem inwardly with its axis divergent from the axis of the valve stem to such an extent as to cause the inner closable terminus of the duct to emerge from the side of the valve stem at a location intermediate the inner and outer ends of the stem.

4. As a new article of manufacture a valve for inflatable articles, which comprises a projecting stem having a duct formed therein, said duct having an inner closable end and said stem including an outer end and an inner end, the duct being sufficiently straight to permit complete through-penetration of the duct from one end to and through the other end by a rigid inflating tool, the mean axis of the duct being disposed at an acute angle to the axis of the stem, and a resilient flap on the stem extending also at an acute angle to the duct axis, and in the general direction of the duct, and having a displaceable free edge portion located over the inner end of the duct, said freely displaceable edge portion being in the line of projection of an inflating tool, to be flexed and slightly displaced by actual contact therewith as such tool is advanced against and past said flap edge at an acute angle so as to easily slip past said flap edge.

5. As a new article of manufacture a valve for inflatable articles, which comprises a projecting stem having a duct formed therein, said duct having an inner closable end and said stem including an outer end and an inner end, the duct being sufficiently straight to permit complete through-penetration of the duct from one end to and through the other end by a rigid inflating tool, and a resilient flap on the stem extending at an acute angle to the duct axis, and in the general direction of duct extension, said flap including a displaceable free edge portion located over the inner end of the duct, said edge portion of the flap being in the line of projection of an inflating tool, to be flexed and slightly displaced by actual contact therewith as such tool is advanced against and past said flap edge at an acute angle, so as to easily slip past said flap edge.

6. As a new article of manufacture a valve for inflatable articles, which comprises a soft rubber-like projecting stem having a substantially straight duct formed therein, said duct having an outer end emerging from one end of the stem, and having an inner terminus directed obliquely toward but falling short of the side wall of the stem, the axis of said duct being at an acute angle to the axis of the stem, said side wall of the stem being knife-slitted at an acute angle thereto for a distance sufficient to meet the inner terminus of the duct, the slit thereby forming a feather-edged flap on the stem side wall to provide a closure for the inner terminus of the duct.

7. As a new article of manufacture a valve for inflatable articles, which comprises a soft rubber like projecting stem having a substantially straight duct formed therein, said duct having an outer end emerging from one end of the stem, and having an inner terminus directed obliquely toward but falling short of the side wall of the stem, the axis of said duct being at an acute angle to the axis of the stem, said side wall of the stem being knife-slitted at an acute angle thereto for a distance sufficient to meet the inner terminus of the duct, the slit thereby forming a feather-edged flap on the stem side wall to provide a closure for the inner terminus of the duct, the slit aforesaid being formed in substantial alignment with the duct axis to permit free through-penetration of the duct and the slit by a rigid inflating tool without extreme distention of the feather-edged flap.

8. As a new article of manufacture a valve for inflatable articles, which comprises a soft rubber like projecting stem having a substantially straight duct formed therein, said duct having an outer end emerging from one end of the stem, and having an inner terminus directed obliquely toward but falling short of the side wall of the stem, the axis of said duct being at an acute angle to the axis of the stem, said side wall of the stem being knife-slitted at an acute angle thereto for a distance sufficient to meet the inner terminus of the duct, the slit thereby forming a feather-edged flap on the stem side wall to provide a closure for the inner terminus of the duct, and a flexible resilient band disposed about the stem and substantially covering said flap.

HARRY F. EKEN.